United States Patent [19]
Damminger

[11] Patent Number: 5,657,745
[45] Date of Patent: Aug. 19, 1997

[54] SOLAR HEAT COLLECTING PANEL

[76] Inventor: Rudolf K. Damminger, 7775 Savannah Ct., Naples, Fla. 33942

[21] Appl. No.: 585,946

[22] Filed: Jan. 16, 1996

[51] Int. Cl.$^6$ ............................................. F24J 2/00
[52] U.S. Cl. .................... 126/633; 126/649; 126/658; 126/652; 126/660; 126/704
[58] Field of Search ............................ 126/674, 675, 126/658, 651, 660, 649, 652, 648, 704, 633, 621, 623

[56]         References Cited

U.S. PATENT DOCUMENTS

| | | | |
|---|---|---|---|
| 842,658 | 1/1907 | Haskell | 126/651 X |
| 4,060,070 | 11/1977 | Harter | 126/648 X |
| 4,068,652 | 1/1978 | Worthington | 126/633 |
| 4,085,729 | 4/1978 | Schmidt | 126/633 |
| 4,180,055 | 12/1979 | Hudwall | 126/658 |
| 4,184,480 | 1/1980 | Kenny | 126/704 |
| 4,201,195 | 5/1980 | Sakhuja | 126/651 X |
| 4,278,072 | 7/1981 | Ryan et al. | 126/623 |

FOREIGN PATENT DOCUMENTS 363006343   1/1988   Japan ........................... 126/621

*Primary Examiner*—Carl D. Price
*Attorney, Agent, or Firm*—Merrill N. Johnson

[57]         ABSTRACT

A solar heat collecting panel having three stacked compartments enclosed within a frame. A pair of similar spaced apart parallel clear plastic sheets form the top and bottom of the uppermost compartment. The middle compartment is formed by the bottom sheet of the uppermost compartment and a similar parallel spaced apart sheet. A metallic heat absorption sheet lies parallel to the bottom sheet of the uppermost compartment and is spaced between the top and bottom sheets of the middle compartment. The upper side of the metallic sheet is covered with a black coating. The lowermost compartment is formed by the bottom sheet of the middle compartment and a similar parallel spaced apart sheet lying beneath the bottom sheet of the middle compartment. The five sheets of the solar heat collecting panel may be either flat or contour-profiled.

8 Claims, 3 Drawing Sheets

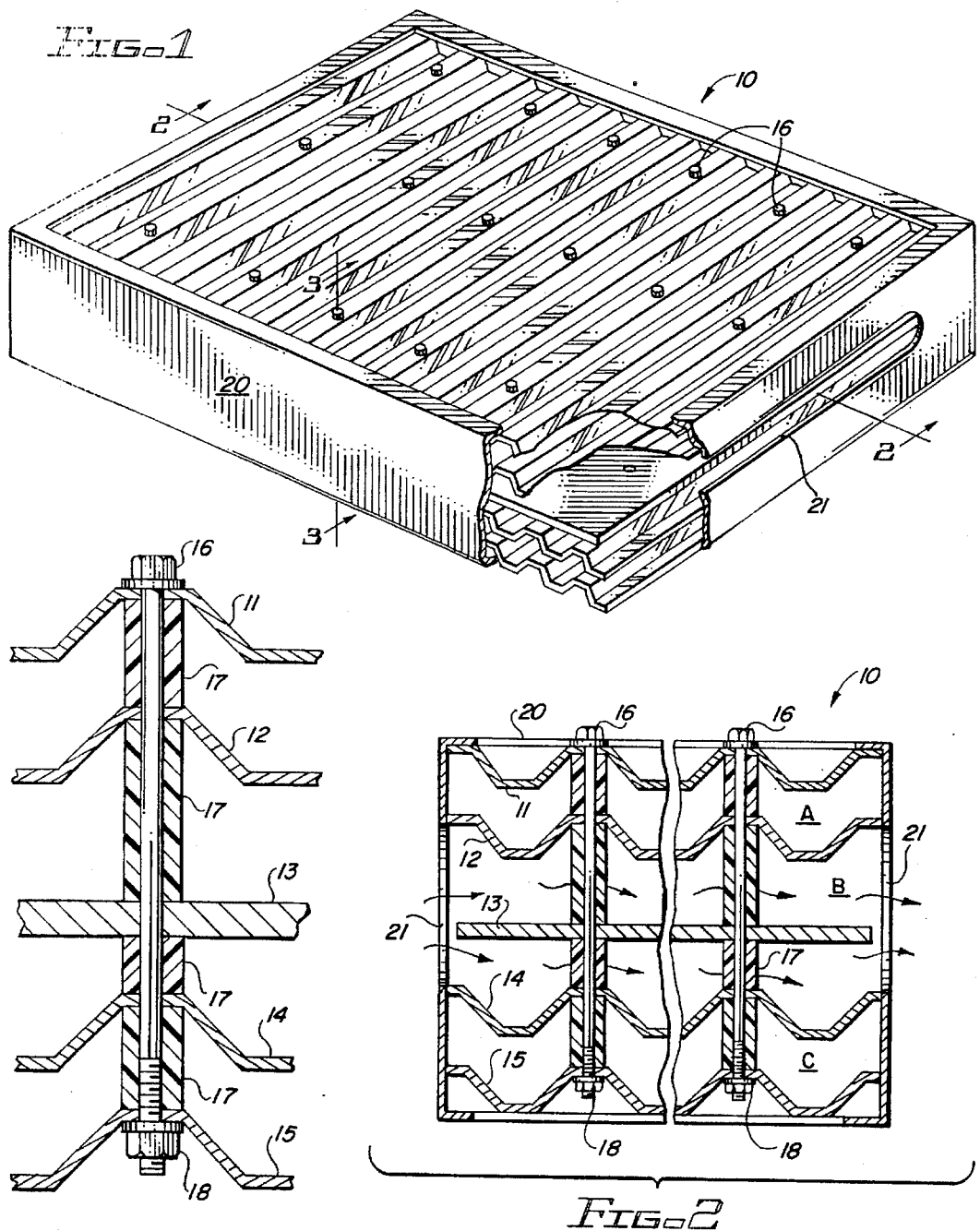

SOLAR HEAT COLLECTING PANEL

FIELD OF THE INVENTION

This invention relates to solar heat collectors and in particular to a very efficient device, yet simple and inexpensive to construct, capable of generating temperatures approaching 300° F. (150° C.).

BACKGROUND OF THE INVENTION

The use of solar radiated heat as an efficient and environmentally acceptable energy source is becoming more widespread as improvements are made in means to capture the sun's heat and to store and utilize the captured solar heat.

Perhaps the most widely used form of solar collectors is a rectangular panel and a great many types of panels have been suggested, some of which have been used with varying degrees of success.

I have invented a solar heat collecting panel whose outline may be rectangular, square or some other shape but which can be easily constructed of readily available components and yet will produce and store solar generated temperatures of up to 200° F. above the ambient temperature at the collecting panel.

Briefly put, the solar heat collecting panel has three stacked compartments bounded by a frame which is preferably made of a reflecting metal such as aluminum or an insulating material such as a plastic or wood or combinations thereof. Two similar parallel and spaced apart sheets of clear plastic material constitute the upper and lower boundaries of the uppermost compartment. The two sheets may be contour-profiled or flat.

The middle compartment is formed by placing a third similarly dimensioned sheet parallel to and spaced beneath the sheet forming the lower boundary of the uppermost compartment.

A metallic heat absorption sheet is located between the upper and lower sheets of the middle compartment. The upper surface of the heat absorption sheet is covered with a preferably flat black coating and the sheet is preferably dimensioned to leave a small gap between its outer edges and the panel's frame.

The lowermost or bottom compartment is formed by placing a fourth similarly dimensioned sheet parallel to and spaced beneath the sheet forming the lower boundary of the middle compartment. The sheets forming the three compartments and the heat absorption sheet are held in spaced relation to each other preferably by a series of elongated bolts and nuts and a suitable number of cylindrical spacers which are located at spaced intervals across the entire panel.

In operation, my panel is positioned so the upper sheet of the panel's uppermost compartment lies perpendicular to the sun's rays. The sun's rays pass through the clear plastic sheets of the uppermost compartment, slightly warming the uppermost compartment, and them heating the black coated surface of the metallic heat absorption sheet which efficiently stores the solar heat transmitted by the sun's rays. The air trapped in the uppermost and lowermost compartments of the panel act as heat dams which minimize conductive and convective heat loss from the middle compartment. It is thus possible to raise the temperature in the middle compartment to as much as 200° F. above the ambient temperature around the panel under optimal sun radiation.

A number of methods may be employed to transfer the heat generated within the middle compartment for use outside the panel for heating the air in a home or the water in a swimming pool or a central heat exchanger, to mention only three of the many uses of the heat generated by my solar heat collecting panel.

The one preferred method pumps air at ambient temperature through an elongated slot in one end of the frame opening into the middle compartment without disturbing the heat dams in the upper and lower compartments. The air pumped into the middle compartment through the slot in one end of the panel is heated to or near the temperature of the middle compartment and then exhausted out of a similar slot in the opposite end of the panel and the heated air moved to a remote location for use as a direct source of heat.

Another method places a length of flexible tubing onto the upper black coated surface of the metallic heat absorption sheet. Heat absorbing liquid or gas is pumped through the tubing to absorb heat from the middle compartment and transport that heat for use outside the heat collecting panel.

BRIEF DESCRIPTION OF THE DRAWINGS

FIG. 1 is a perspective view partly broken away of the preferred embodiment of the invention using contour-profiled sheets.

FIG. 2 is a cross-sectional side elevational view partly broken away taken along line 2—2 of FIG. 1 which illustrates air being heated flowing through the middle compartment of the panel.

FIG. 3 is a detailed broken away view partly in cross-section taken along line 3—3 of FIG. 1 showing the bolt and spacers and nut which hold the five sheets of the panel together.

DESCRIPTION OF THE PREFERRED EMBODIMENTS

Figure 4:
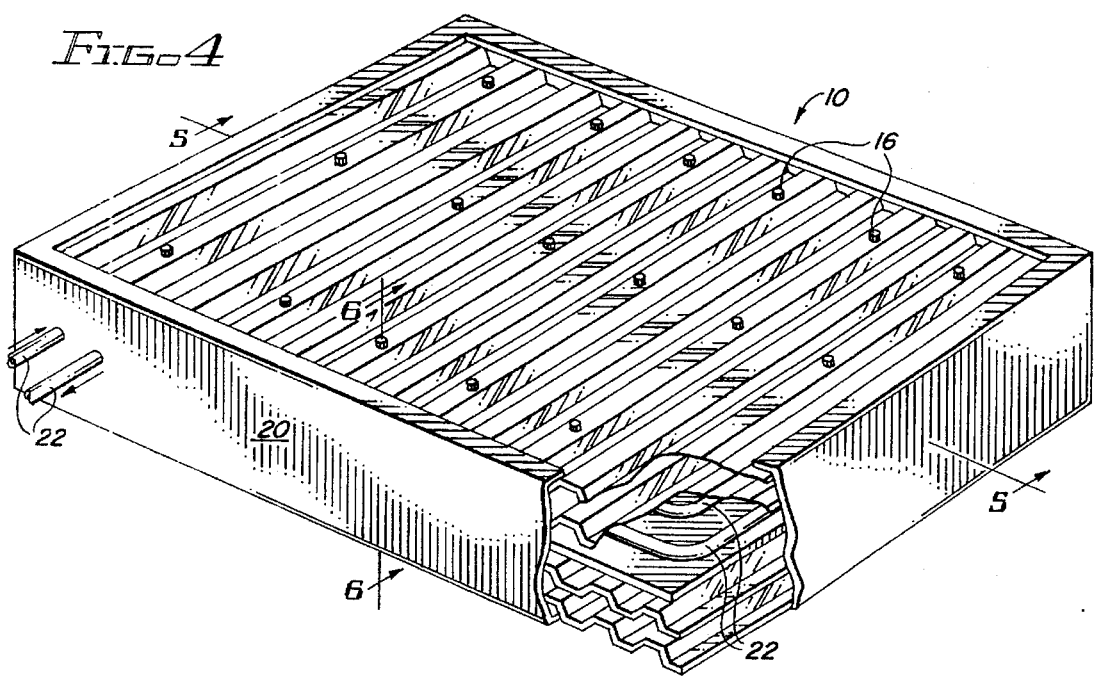
FIG. 4 is a perspective view partly broken away of another embodiment using a tube to transfer heat from the panel.
Figure 6:
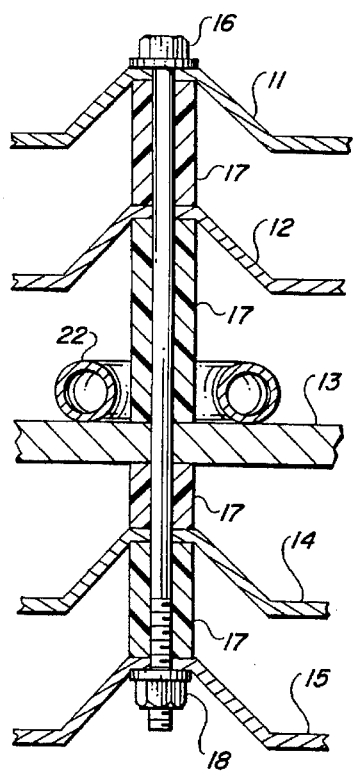
FIG. 6 is a detailed broken away view partly in cross-section taken along line 6—6 of FIG. 4 showing details of the embodiment illustrated in FIG. 4.
Figure 5:
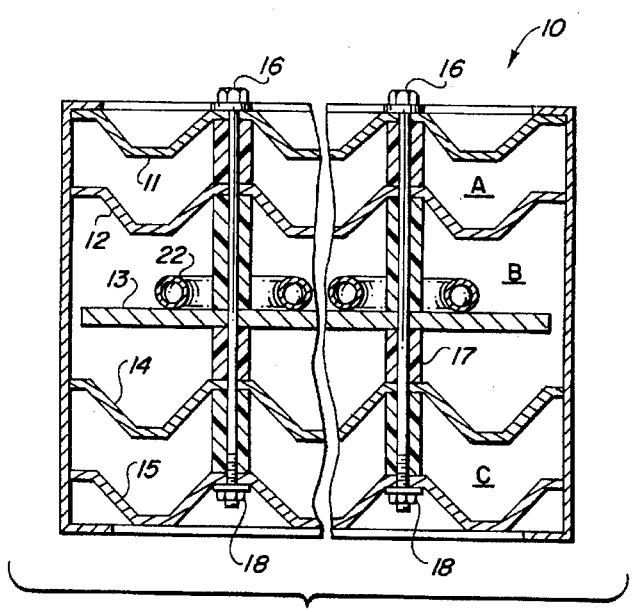
FIG. 5 is a cross-sectional side view taken along line 5—5 of FIG. 4.

FIG. 1 of the drawings illustrates a preferred form of the solar heat collecting panel 10 which contains three stacked compartments bounded by a frame 20 preferably made of insulating materials such as wood or plastic. FIG. 2 is a partially broken away side elevational view of panel 10 in which its three compartments are labeled A, B and C.

Two similar parallel and spaced apart clear plastic contour-profiled sheets 11 and 12 form the upper and lower boundaries of compartment A, the uppermost or top compartment of panel 10.

Compartment B, the middle compartment, is formed by placing a third similarly dimensioned sheet 14 parallel to and spaced beneath sheet 12. A metallic heat absorption sheet 13 is located between sheets 12 and 14 and the upper surface of metallic sheet 13 is covered with a flat black coating to absorb and store the heat generated by the sun's rays. Preferably metallic sheet 13 is dimensioned to leave a small gap between its outer edges and frame 20.

Compartment C, the lowermost or bottom compartment, is bounded on its sides by frame 20 and by sheet 14 above and a similar parallel and spaced apart sheet 15 below.

A convenient feature of panel 10 with its contour-profiled plastic sheets 11, 12, 14 and 15 all lying parallel to each other as best shown in FIGS. 2 and 3 is that it facilitates the construction of frame 20 in sections designed to follow the contour of the parallel but spaced apart plastic sheets.

To operate most efficiently, panel 10 is positioned so that its clear plastic sheet 11 lies perpendicular to the sun's rays. The sun's rays pass through clear plastic sheets 11 and 12, thereby slightly warming uppermost compartment A and then heating the black coated surface of metallic heat absorption sheet 13 which efficiently stores the solar heat transmitted by the sun's rays. The air trapped in compartments A and C of panel 10 act as heat dams which markedly reduce conductive and convective heat loss from middle compartment B thereby making it possible to raise the temperature in compartment B to as much as 200° F. above the ambient temperature at panel 10.

Two of the methods of utilizing the heat generated and stored in the middle compartment B of panel 10 are illustrated in FIGS. 1 and 4. In the first and preferred method, frame 20 of panel 10 contains on its opposite ends an elongated slot 21 so that air at ambient temperature can be pumped through slot 21 into middle compartment B where the air is heated to or near the temperature within compartment B and then the heated air is drawn out through slot 21 in the opposite end of panel 10 as shown in FIG. 1 for use outside the panel as a direct heat source. The flow of air through compartment B is illustrated by the wavy arrows in FIG. 2.

Figure 7:
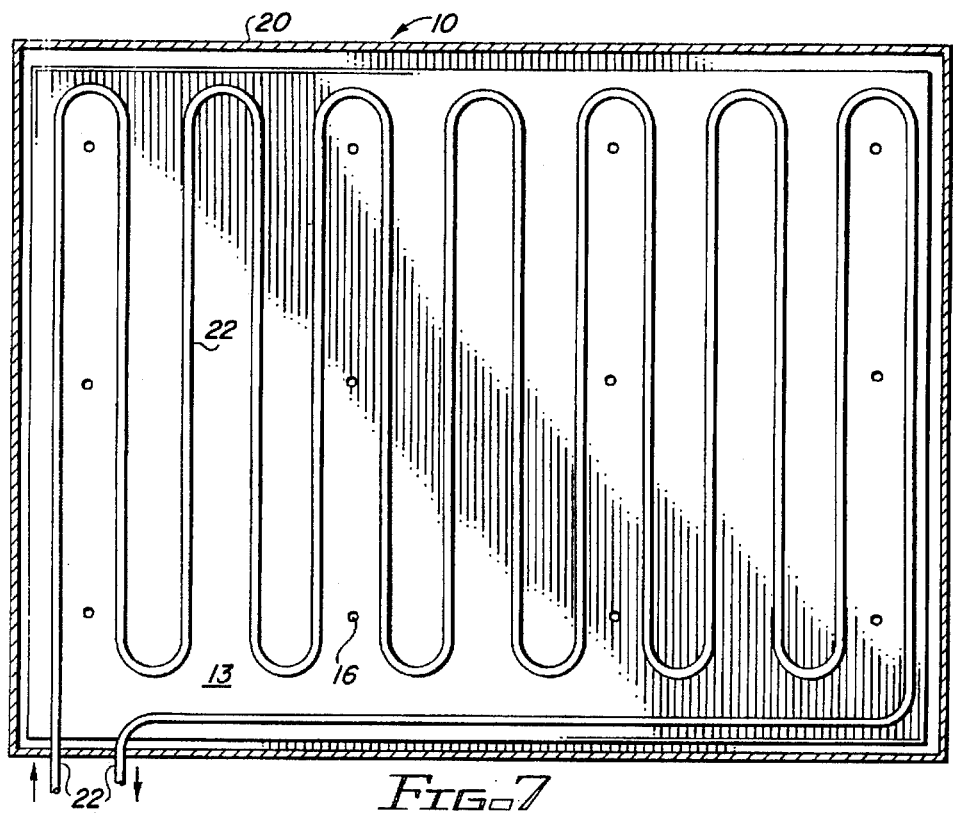
FIG. 7 is a cross-sectional top plan view of the embodiment illustrated in FIG. 4.

The second method whose details are illustrated in FIGS. 4, 5, 6 and 7, employs an elongated flexible tube 22 which is laid on top of the black coated upper surface of metallic heat absorption sheet 13 with its opposite ends exiting from panel 10 as shown in FIGS. 4 and 7. A heat absorbing liquid or gas is slowly pumped through tube 22 lying on heat absorption sheet 13 to transfer heat from the heat absorption sheet into the fluid within tube 22 to move the heat stored within sheet 13 for use outside of panel 10.

Figure 8:
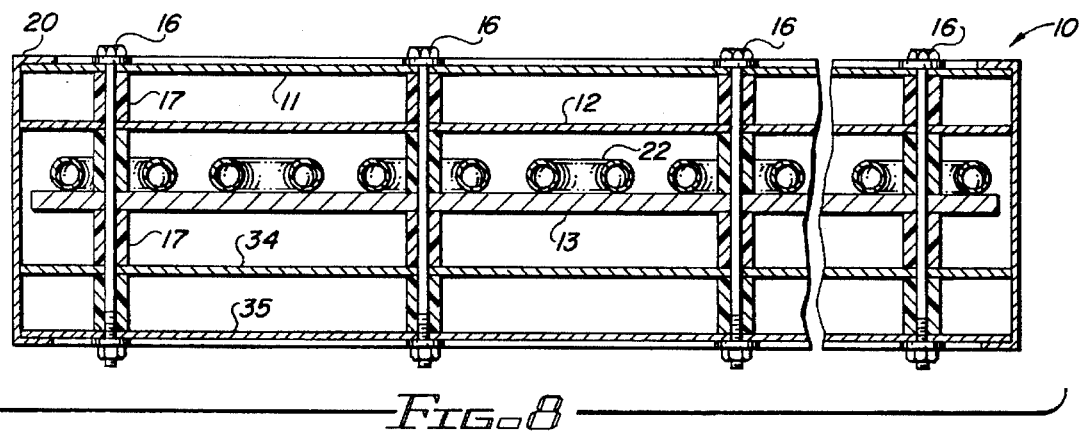
FIG. 8 is a partly broken away cross-sectional side view of another embodiment of the invention in which the clear plastic sheets are flat rather than contour-profiled as in the panels illustrated in FIGS. 1 and 4.
Figure 9:
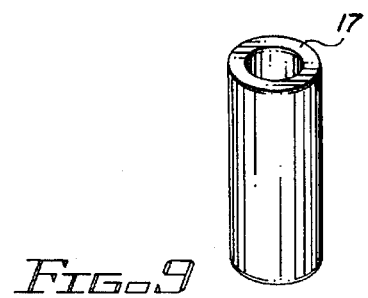
FIG. 9 illustrates one of the cylindrical spacers used to separate the sheets of the solar heat collecting panels.

FIG. 8 illustrates a third form of the unique solar heat collecting panel. Panel 10 again includes three stacked compartments enclosed within a frame 20. Two parallel spaced apart flat clear plastic sheets 11 and 12 form the upper and lower boundaries of the uppermost or top compartment.

Sheet 12 and a parallel and spaced apart flat metallic sheet 34 form the upper and lower boundaries of the middle compartment which houses a metallic heat absorption sheet 13 lying parallel with and between sheets 12 and 34. The upper surface of metallic sheet 13 is covered with a flat black coating and a length of flexible tubing 22 lies on the upper black surface of metallic sheet 13. Heat absorbing fluid flowing through tubing 22 will absorb stored heat from sheet 13 and its black coating to be transported for use outside panel 10.

Flat metallic sheet 34 and a similar parallel spaced apart sheet 35 form the upper and lower boundaries of the lowermost or bottom compartment of panel 10. Except for the fact that its four sheets 11, 12, 34 and 35 are flat rather than contour-profiled, panel 10 shown in FIG. 8 operates exactly like the panels 10 in FIGS. 1 and 4 in its ability to collect and store solar heat.

Having described and illustrated three embodiments of my unique solar heat collecting panel, the following claims define the scope and spirit of my invention.

I claim:

1. A solar powered heat collecting panel having three compartments stacked vertically one above the other, said panel bounded by a surrounding frame in which solar radiation first passes through two parallel spaced apart clear plastic sheets and is then absorbed by the black coated upper surface of a single metallic heat absorption sheet exposed to the solar radiation, the length and width of the metallic heat absorption sheet being approximately equal to the length and width of the two clear plastic sheets, the two parallel spaced apart clear plastic sheets and the surrounding frame forming the top compartment uppermost of the three compartments, the lowermost sheet of the aforesaid two parallel spaced apart sheets in the top compartment and an identically structured sheet lying beneath and spaced from the metallic heat absorption sheet and the surrounding frame forming the middle compartment of the three compartments, and said identically structured lowermost sheet of the middle compartment and a further identically structured sheet lying beneath said lowermost sheet of the middle compartment and the surrounding frame forming the lowermost of the three compartments, said lowermost compartment acting as a lower side heat dam which reduces conductive and convective heat loss from the middle compartment, whereby elongated slots in opposite ends of the frame permit fluid to be admitted into and drawn out of the middle compartment to provide air heated in the middle compartment for use within or outside the panel, whereby said sheets are spaced apart and secured in place by a series of similar elongated bolts and nuts and a plurality of cylindrical spacers.

2. A solar powered heat collecting panel as set forth in claim 1 in which both of the clear plastic sheets, the metallic heat absorption sheet and the sheets beneath the metallic heat absorption sheet are flat.

3. A solar powered heat collecting panel as set forth in claim 1 in which both the clear plastic sheets and the sheets beneath the metallic heat absorption sheet are identically structured corrugated-profiled.

4. A solar heat collecting panel as set forth in claim 1 in which the frame enclosing the three compartments and the metallic heat absorption sheet is made of insulating materials.

5. A solar heat collecting panel as set forth in claim 1 in which the uppermost and the lowermost compartments act as heat dams reducing conductive and convective heat loss from the middle compartment and permitting temperatures in the middle compartment of up to 200° F. above the ambient temperature surrounding the solar heat collecting panel.

6. A solar heat collecting panel as set forth in claim 1 which includes a tube lying on the upper surface of the black coated metallic heat absorption sheet and leading into and out of the middle compartment and a fluid flowing through the tube to absorb heat from the middle compartment for use outside the heat collecting panel.

7. A solar heat collecting panel as set forth in claim 1 which includes elongated slots in opposite ends of the frame permitting air to be admitted into and drawn out of the middle compartment to provide air heated in the middle compartment for use outside the panel as a direct heat source.

8. A solar powered heat collecting panel as set forth in claim 1 in which the five sheets are spaced apart and secured in place by a series of similar elongated bolts and nuts and a plurality of cylindrical spacers.

* * * * *